Jan. 29, 1924.

A. H. CANDEE 1,481,888

AIR CONDUCTOR FOR RAILWAY MOTORS

Filed April 7, 1920

WITNESSES:
H. J. Shelhamer
H. C. Lowe

INVENTOR
Andrew H. Candee
BY
Wesley G. Carr
ATTORNEY

Patented Jan. 29, 1924.

1,481,888

UNITED STATES PATENT OFFICE.

ANDREW H. CANDEE, OF WILKINSBURG, PENNSYLVANIA, ASSIGNOR TO WESTINGHOUSE ELECTRIC & MANUFACTURING COMPANY, A CORPORATION OF PENNSYLVANIA.

AIR CONDUCTOR FOR RAILWAY MOTORS.

Application filed April 7, 1920. Serial No. 372,022.

*To all whom it may concern:*

Be it known that I, ANDREW H. CANDEE, a citizen of the United States, and a resident of Wilkinsburg, in the county of Allegheny and State of Pennsylvania, have invented a new and useful Improvement in Air Conductors for Railway Motors, of which the following is a specification.

My invention relates to conductors for fluids, and it has particular relation to apparatus of the character designated for connecting together two relatively movable bodies, such, for example, as an electric railway motor mounted on a railway truck and a relatively movable air duct common to a number of such motors and mounted on the associated railway car body.

The object of my invention is to produce a flexible air conductor of simple design, which shall be relatively inexpensive in construction, of great durability, and which shall have its interior substantially free from irregularities.

Heretofore, a number of different types of air conductors have been employed in railway service, but their interior surfaces, when inflated, were irregular and presented considerable obstruction to the free passage of air therethrough, resulting in a loss of power and a reduction in the amount of air which could be transmitted.

By my invention, I provide a plurality of frames so attached to the conductor that, when the conductor is inflated, its various cross-sections are substantially uniform and the interior surface is free from irregularities, thus eliminating, to a large extent, the loss of power caused by air pockets and eddy currents and rendering possible the passage of a greater quantity of air therethrough.

Briefly speaking, my invention consists of a flexible tube, the inner surface of which is smooth, when inflated, so as to present little opposition to the passage of air, and the outer surface of which is reinforced so as to cause the tube to retain the desired contour and cross-section throughout its entire length.

Figure 1:
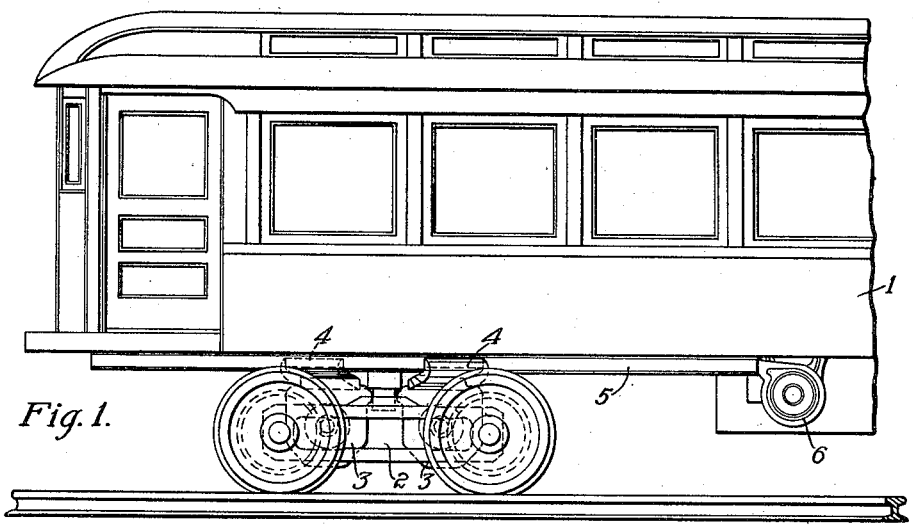
Figures 2, 3, 4:
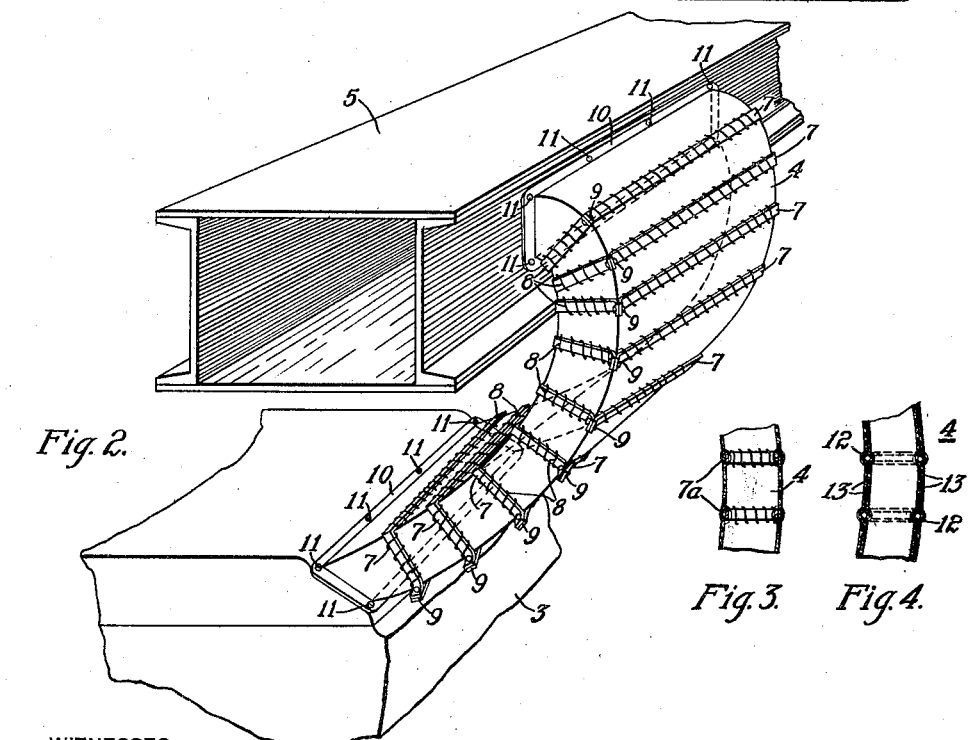

A better understanding of my invention may be had by reference to the accompanying drawings, of which Fig. 1 is a view, in side elevation, of a railway car provided with an air duct connected to the various railway motors by means of air conductors embodying my invention. Fig. 2 is a perspective view of a portion of Fig. 1, illustrating a conductor constructed in accordance with my invention. Figs. 3 and 4 are cross-sectional views of air conductors illustrating slight modifications in the means for attaching the reinforcing frames to the conductors.

Referring particularly to Fig. 1, a railway car body 1 is shown mounted on trucks 2, (only one of which is shown). A plurality of electric motors 3 are mounted on each truck 2 to drive the car and are provided with cooling air by means of a rigid air duct or conductor 5 mounted upon the car body, which is supplied with air by means of a fan 6, also mounted on the car body, and a flexible conductor 4 connected between the motors 3 and the duct 5. The air conductor 5 may, if desired, be a portion of the supporting structure of the car body.

The flexible conductor 4 embodying my invention, as best shown in Fig. 2, is made of pliable material, such, for example, as canvas, and connects the air duct 5 with the railway motor 3 mounted upon the relatively movable truck 2. A plurality of spaced frames 7 are shown attached to the outer surface of the air conductor 4 by means of a binding material 8, usually heavy cord. The frames 7 may be made of fiber, wood, metal. micarta, or any other material which will have sufficient strength to keep the conductor in shape, when it is inflated. and may be sewed or otherwise attached thereto. The frames 7 should be of such construction as not to injure the pliable material of which the conductor is made. The ends of the frames 7 may be connected together in any desirable manner, rivets 9 serving that purpose in the structure shown in Fig. 2. When the conductor 4 is not inflated, the frames 7 prevent it from collapsing completely, and when inflated it tends to assume a form of circular cross-section, which the frames 7 prevent.

The air conductor 4 may be attached to the air duct 5 and the railway motor 3 by any suitable means, that shown in the drawings being frames 10 fastened to the ends of the conductor 4 and attached to the duct 5 and the motor 3 by means of screws 11.

Fig. 3 is a sectional view, taken in a plane perpendicular to the longitudinal sides of the frame 7, of a modification of the conductor 4 in which the frames 7ª are attached to the interior surface thereof in any suitable manner. This arrangement is not as desirable as the first arrangement shown, as the frames offer an unnecessary obstruction to the free passage of air through the conductor. However, a design such as this is preferable to a conductor of the bellows type, as the obstruction will not be as great and no dead air pockets will be formed.

Fig. 4 shows an arrangement wherein the frames 12, preferably of cylindrical wire, are attached to the conductor 4 between two layers 13 of the material comprising the walls thereof. This construction, while more desirable than that shown in Fig. 3, is inferior to that shown in Fig. 2 for the reason that the frames 7 shown in Fig. 2 may be more readily replaced, in event that they become impaired.

When the fan 6 is in operation, air is driven through the air duct 5, which may be also a supporting beam for the car, to the conductors 4. The air passes through the conductors 4 to the motors 3, thereby causing the conductors 4 to assume the cross-section determined by the frames 7 throughout its entire length, their interior surfaces being practically free from irregularities.

From the foregoing description, it will be obvious to those skilled in the art that either a saving of power may be effected or an increased amount of cooling air may be moved, or both, by the use of my invention, and that apparatus constructed in accordance therewith is relatively simple and inexpensive to manufacture, and strong and durable in construction.

While I have shown my invention in a preferred form, I do not desire to be limited thereto, but rather be limited only by the spirit and scope of the appended claims.

I claim as my invention:

1. The combination with a dynamo-electric machine mounted on a car, and a source of air for supplying said dynamo-electric machine, of a flexible conductor made of pliable material connected to said dynamo-electric machine and to said source and provided with means for maintaining the shape of said conductor substantially uniform when inflated.

2. The combination with a motor mounted on a car, and a source of air for supplying said motor, of a flexible conductor made of pliable material connected to said motor and to said source and provided with a plurality of frames for maintaining predetermined cross-sections of said conductor when inflated.

3. The combination with a motor mounted on a car, and a source of air for supplying said motor, of a flexible conductor made of pliable material connected to said motor and to said source and provided with a plurality of polygon frames for maintaining predetermined cross-sections of said conductor when inflated.

4. The combination with a motor mounted on a car, and a source of air for supplying said motor, of a flexible conductor made of pliable material connected to said motor and to said source and provided with a plurality of spaced frames for maintaining predetermined cross-sections of said conductor when inflated.

5. The combination with a motor mounted on a car, and a source of air for supplying said motor, of a flexible conductor made of pliable material connected to said motor and to said source and provided with a plurality of frames attached to said conductor for maintaining the interior surface thereof substantially free from irregularities when said conductor is inflated.

6. The combination with a motor mounted on a car, and a source of air for supplying said motor, of a flexible conductor made of pliable material connected to said motor and to said source and provided with a plurality of frames attached to the outer surface of said conductor, the conductor and the frames being so proportioned as to maintain the interior surface of the conductor substantially free from irregularities when said conductor is inflated.

7. The combination with a motor mounted on a car and a source of air for supplying said motor, of a canvas conductor connected to said car and to said source, and a plurality of rigid frames attached to the outer surface of said conductor for maintaining the shape uniform and the interior surface thereof substantially free from irregularities when inflated.

In testimony whereof, I have hereunto subscribed my name this 12th day of March 1920.

ANDREW H. CANDEE.